Oct. 21, 1969 J. R. PETRICK 3,474,337
SYSTEM FOR SENSING LEVELS AND ELECTRICAL
CHARACTERISTICS OF FLUENT MATERIALS
Filed Dec. 27, 1966 3 Sheets-Sheet 1

INVENTOR.
JOSEPH R. PETRICK
BY
Woodhams, Blanchard & Flynn
ATTORNEYS

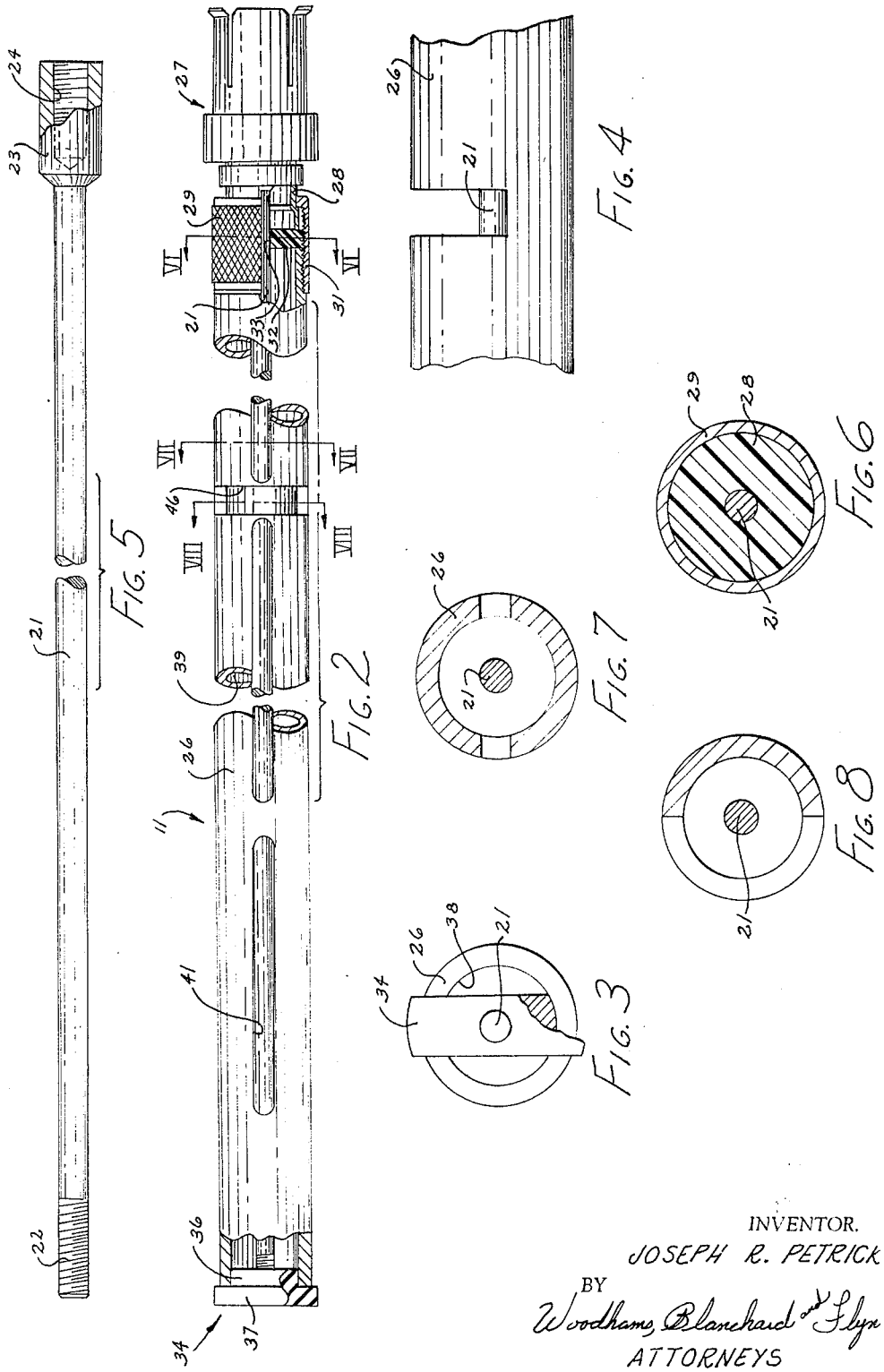

Oct. 21, 1969    J. R. PETRICK    3,474,337
SYSTEM FOR SENSING LEVELS AND ELECTRICAL
CHARACTERISTICS OF FLUENT MATERIALS
Filed Dec. 27, 1966    3 Sheets-Sheet 3
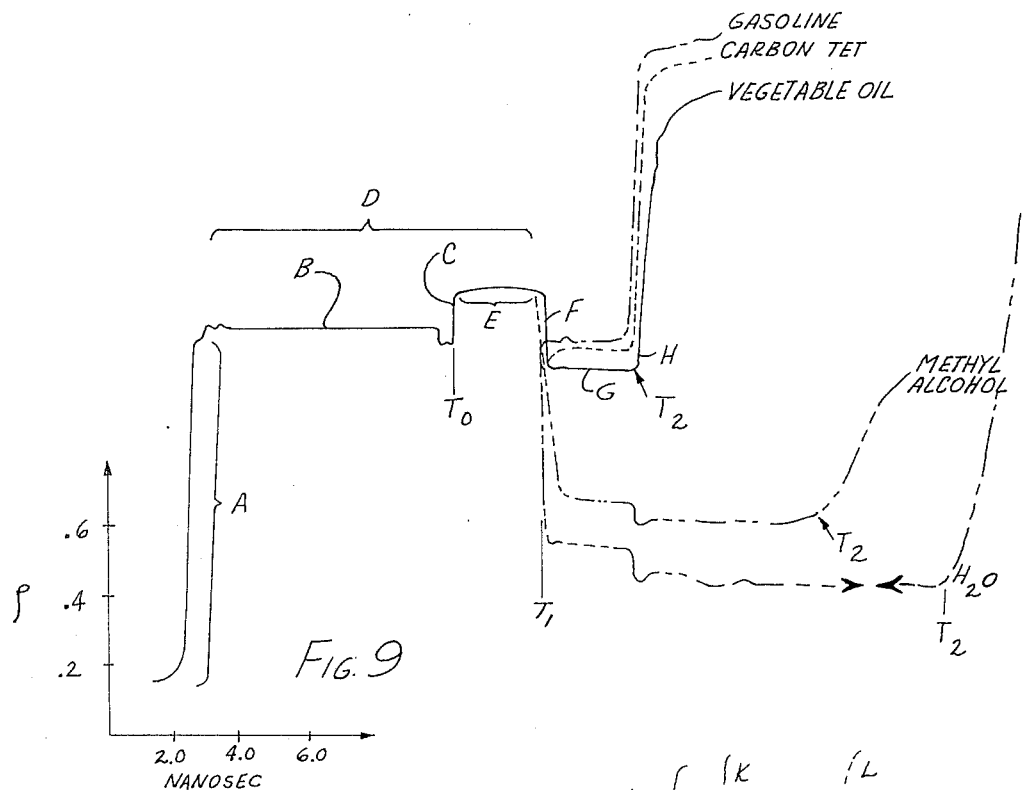
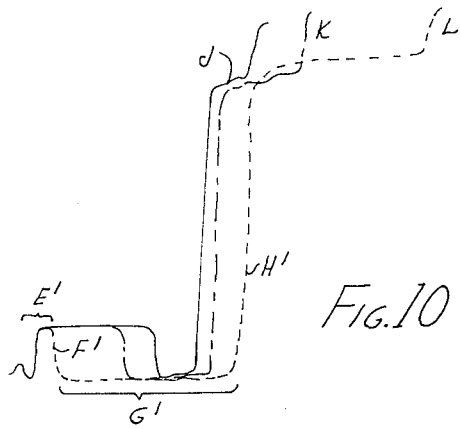
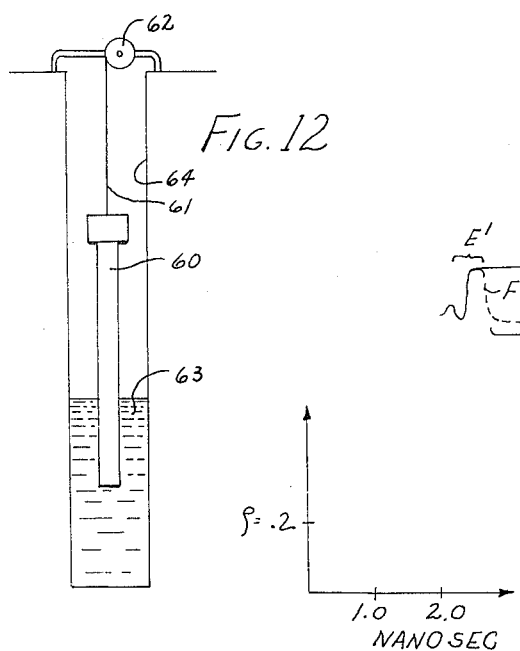
INVENTOR.
JOSEPH R. PETRICK
BY
Woodhams, Blanchard & Flynn
ATTORNEYS

United States Patent Office 3,474,337
Patented Oct. 21, 1969

3,474,337
SYSTEM FOR SENSING LEVELS AND ELECTRICAL CHARACTERISTICS OF FLUENT MATERIALS
Joseph R. Petrick, Satellite Beach, Fla., assignor to Jackson & Church Electronics Company, Inc., Satellite Beach, Fla., a corporation of Indiana
Filed Dec. 27, 1966, Ser. No. 605,048
Int. Cl. G01r 27/04
U.S. Cl. 324—58.5      4 Claims

ABSTRACT OF THE DISCLOSURE

A system for determining characteristics of fluent media having generating means for producing a series of D.C. pulses having rapid rise times. A probe is provided which consists of a pair of conductors which receive the generated pulses. The probe is normally disposed in a container having the fluent media disposed therein and the probe acts as a transmision line segment wherein the fluent media is substituted for the normal dielectric material. A detecting device is connected to the probe and is capable of determining and reading out the time distribution of reflections and also capable of reading out the corresponding amplitude changes of the composite incident and reflected signal taken from the probe.

---

This invention relates to a method and system for accurately measuring physical properties of fluent materials and more particularly relates to a method and system which makes use of the phenomenon of signal reflection by impedance discontinuities in a transmission line.

It is known that when a pulse is impressed on a uniform transmission line having an impedance discontinuity along its length, a portion of the signal will be reflected by the discontinuity and will return to the input end of the transmission line. In the testing of transmission lines for faults, the distance between the input end of the uniform transmission line and a fault is determined by detecting the time interval required for the pulse to travel to and return from the fault or discontinuity.

The present invention contemplates using this reflection phenomenon for measuring various physical properties of fluent media. More particularly, the present invention contemplates placement of a probe in fluent layered media for measuring such geometrical parameters of the media as their levels and electrical characteristics including dielectric constant, permeability and leakage resistance. The probe is constructed as a uniform transmission line segment and includes a pair of conductors between which the media to be measured are admitted for determining the impedance of the adjacent portions of the probe. Thus, for example, where the probe extends through air into water, the air-water interface provides a reflecting impedance discontinuity as a result of the differing dielectric constants of air and water and the liquid level can be determined from transmission-reflection time interval of a pulse impressed on the probe. Similarly, if the length of probe contacted by the medium is known, its dielectric constant can be found.

In developing the present invention it was noted that the electrical characteristics, e.g., the dielectric constant, of the medium being measured may change with temperature. A change in the dielectric constant of a dielectric fluid in which the probe is immersed changes the time required for a pulse to travel a given distance along the probe. Thus, in measuring the level of a dielectric liquid in a tank at a temperature for which the apparatus is not calibrated, the liquid level can be computed only with considerable effort from the amplitude changes and time intervals therebetween of the composite incident-reflected signal at the probe input terminal. However, the present invention further contemplates, at least as a narrower aspect, that the probe may be provided with geometrical discontinuities at known locations along its length which when used as references enable rapid and more direct determination of liquid level solely by comparison of the locations in time of signal amplitude discontinuity caused by probe geometry discontinuities and by media discontinuities.

As a result, it is an object of this invention to provide a method and system capable of measuring physical properties of fluent media.

A further object is to provide a method and system, as aforesaid, in which a pulse is passed along a transmission line segment, the dielectric of which is formed by fluent media, for measuring the electrical characteristics and levels of said media.

A further object is to provide a system, as aforesaid, which includes a probe for disposal in the medium to be measured, which probe includes electrical conductors separated by the medium, in which the medium forms the dielectric between the conductors, in which the probe and medium for a transmission line section and in which a physical discontinuity in the medium causes an impedance discontinuity in the probe.

A further object is to provide a system, as aforesaid, which includes means for generating a pulse and for measuring the time interval required for the pulse to pass along the probe to a discontinuity and for a reflection to return from the discontinuity.

A further object is to provide a method and system, as aforesaid, by which the levels of fluent media may be measured accurately independently of their temperature and changes in their electrical characteristics.

A further object is to provide a system, as aforesaid, in which the amplitude of the probe output is related to the primary electrical characteristics of the media such as dielectric constant, permeability and conductance and in which the location in time of probe output amplitude changes are related to the location of discontinuities in the media located along the probe as well as to such electrical characteristics.

A further object is to provide a method and system, as aforesaid, which is capable of simultaneously measuring the dielectric constant and level of several layers of different fluent materials.

A further object is to provide a method and system, as aforesaid, in which the measurable fluent media includes gasses, liquids, and fluent solids or combinations thereof.

A further object is to provide a system, as aforesaid, which is usable over a wide range of temperatures, from cryogenic temperatures to the highest temperatures the probe will withstand.

A further object is to provide a probe, as aforesaid, the output of which includes an inherent temperature compensation signal.

Other objects and purposes of this invention will be apparent to persons acquainted with apparatus of this type after reading the following specification and inspecting the accompanying drawings.

In the drawings:

FIGURE 2 is a fragmentary, partially broken elevational view of a preferred probe construction for use with the apparatus of FIGURE 1.

FIGURE 3 is a left end view of the probe of FIGURE 2.

FIGURE 4 is a fragmentary sectional view taken on the line IV—IV of FIGURE 2.

FIGURE 5 is a side elevational view of the central element of the probe of FIGURE 2.

FIGURE 6 is a sectional view essentially taken on the line VI—VI of FIGURE 2.

FIGURE 7 is a sectional view essentially taken on the line VII—VII of FIGURE 2.

FIGURE 8 is a sectional view taken on the line VIII—VIII of FIGURE 2.

FGURE 9 is a composite amplitude-time plot of the output of the system for a number of different test liquids having essentially the same level in the test container.

FIGURE 10 is plot similar to FIGURE 9 for a single liquid taken at various levels in the test container.

Figure 11:
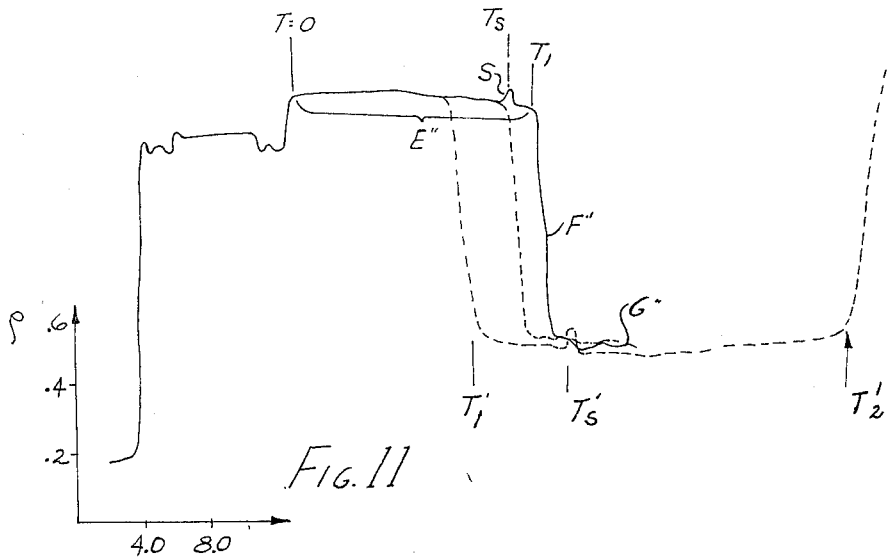

FIGURE 11 is a plot similar to FIGURE 9 for a single liquid showing the effect of a reference slot.

FIGURE 12 is a schematic representation of another manner of practicing the invention.

Certain terminology will be used in the following description for convenience in reference and will not be limiting. More particularly, the words "upwardly," "downwardly," "rightwardly" and "leftwardly" will denote directions in the drawings to which reference is made. The words "inwardly" and "outwardly" will refer to the geometric center of the apparatus and to parts thereof described. Such terminology will include the words above specifically mentioned, derivatives thereof and words of similar import.

GENERAL DESCRIPTION

In general, the objects and purposes of this invention are met by providing a method and system for determining characteristics of fluent media.

The method of the present invention comprises inserting a pair of uniformly spaced, generally parallel conductors into fluid media so that the impedance of the conductors is determined by the adjacent medium. Fast rising pulses are then transmitted along the conductors. Portions of the pulses are reflected from impedance discontinuities along the conductor pair occurring at interfaces between the media and these reflections are detected. The amplitude variation with time of the detected signal is then read out to enable determination of the levels of the media from the time distribution of the amplitude changes and to allow determination of the relative value of an electrical characteristic where a single characteristic predominates in the media to be compared, for example, in the case of dielectric media, determination of dielectric constants of the media.

The system includes generating means of a conventional type for producing a series of spaced D.C. pulses having rapid rise times. A probe is provided which consists of the aforementioned pair of conductors and which receives the pulses. Access is provided to the zone between the conductors along the length thereof. In use, the probe normally is disposed in a container in which fluent media are disposed. The probe acts as a transmission line segment in which the fluent media are substituted for the normal dielectric material.

Within the narrower aspects of the invention, geometrical discontinuities are built into the conductors at known locations thereon for use as markers. Pulses propagating along the probe are partially reflected back along thes probe by the impedance discontinuities resulting from media interfaces and geometrical discontinuities in the probe.

A detecting device connects to the probe. The detecting device may be of any conventional type capable of determining and reading out the time distribution of reflections and preferably also capable of reading out the corresponding amplitude changes of the composite incident and reflected signal taken from the probe.

DETAILED DESCRIPTION

Figure 1:
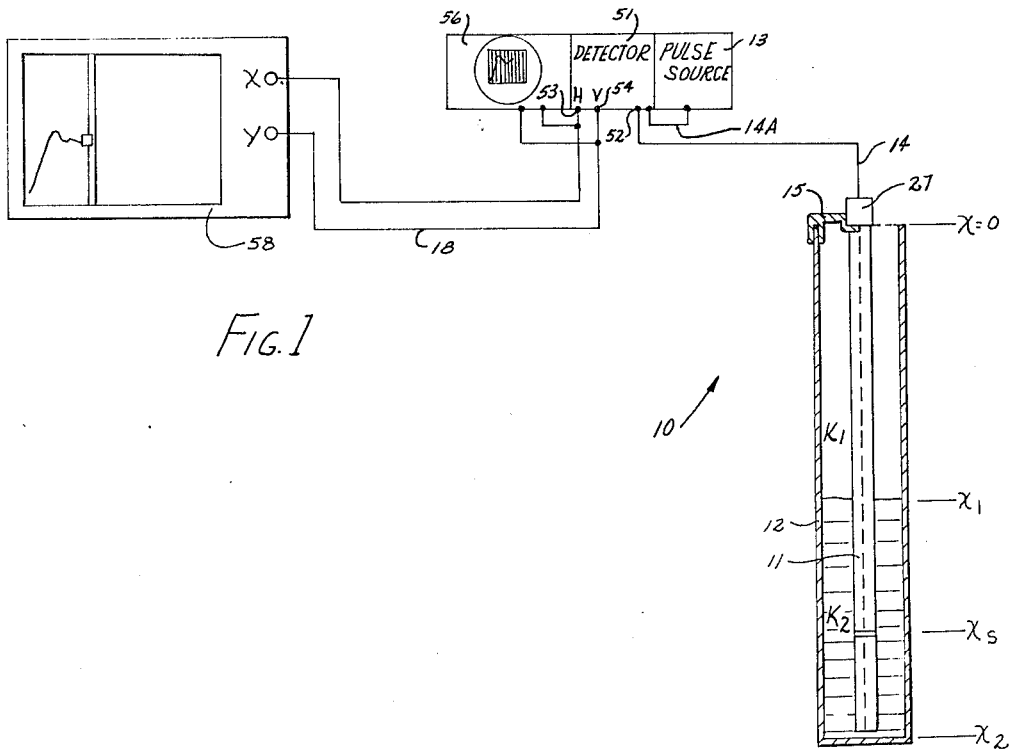
FIGURE 1 is a diagrammatic view of a system embodying the invention.

Turning now to FIGURE 1, the apparatus 10 embodying the invention includes the probe generally indicated at 11. The probe 11 in its normal position of use extends into a container 12 in which fluent media are disposed. The probe 11 is here supported on the container 12 by any convenient means generally indicated at 15. Such media may be gasses, liquids, fluent particulate solids or combinations thereof.

A signal source 13 connects to the detector 51, passes through the detector and out through 52 to cable 14 then to the upper end of the probe 11, here through a coaxial cable 14. The signal source 13 may be of any convenient type capable of generating square D.C. pulses with a rapid rise time. The signal source 13, in the particular embodiment shown, is capable of producing pulses at a repetition rate of about 200 kc. with rise times in the order of 100 picoseconds. Pulse duration is about two microseconds which preferably exceeds the time required for the pulse front to be reflected back along the line 14 from the lower end of the probe. The probe 11 acts as a section of transmission line open at one end and coupled to the source 13 at the other end.

The probe 11 (FIGURE 2) is a preferred embodiment although the system in its broader aspects is not limited to this particular probe construction. The probe 11 includes an elongated rod 21 threaded as indicated at 22 at one end (FIGURES 2 and 5) and having an enlarged hexagonal head 23 at its other end. The head 23 preferably has a threaded coaxial bore indicated in broken lines at 24.

The probe 11 further includes a hollow conduit 26 (FIGURE 2). The conduit 26 is cylindrical and, in the particular embodiment shown, is of constant circular cross section throughout its length. The exterior of the rod is preferably highly polished as is the interior surface of the conduit. The probe further includes a connector 27. Although any suitable connector may be used, the connector 27 in the particular embodiment shown is a low loss type and is a General Radio connector, Model No. 874–QUP, suitably modified to fixedly receive the hexagonal end 23 of the rod 21 coaxially and within the leftward end thereof for contacting a central conductor, not shown, thereof. The connector 27 further includes an axially extending, annular flange 28 which is upset radially outwardly at its leftward end. A surrounding collar 29 is radially inwardly flanged at its rightward end to maintain same on the annular flange 28 by axially interfering with the leftward end thereof. The collar 29 threadedly engages, at 31, the rightward end of the conduit 26. An insulative spacer 32 is axially interposed between the end of the conduit 26 and the end of the flange 28 and is held snugly therebetween. The spacer 32 has the central opening 33 through which the rod 21 extends.

A further spacer 34 is provided at the leftward end of the rod 21 and the conduit 26 for holding the rod and conduit in coaxial alignment. The spacer 34 includes an inner portion 36 which extends diametrally of the conduit 26 and is located snugly therewithin. The spacer 34 further includes an outer portion 37 which may be fixed to or integral with the inner portion 36 and which is aligned therewith. The outer portion 37 abuts the end of the conduit 26 and extends radially therebeyond. The spacer 34 is relatively narrow so as to leave semicircular openings 38 on either side thereof for providing communication with the interior of the conduit 26. The spacers 32 and 34 are of electrically insulative material, here nylon.

Thus, the spacers 32 and 34 maintain the rod 31 coaxially located within the conduit 26. Since the rod 31 and conduit 26 are both of uniform cross section, the probe itself is of uniform cross section throughout its length, to the extent that it has been described above, and, as result, will have a constant impedance throughout its length. The coaxial location of the rod 21 within conduit 26 defines an annular chamber 39 within the conduit.

The conduit 26 is provided with a plurality of inlet openings 41 (FIGURES 2 and 7) distributed along its length. These openings allow the fluent media to be measured to flow into the annular chamber 39 between the conductors 21 and 26. The openings 41 are preferably uniformly spaced along the length of the probe and occupy all but a minor portion of such length so as to maximize direct radial communication through such openings between the media outside the probe and that within the annular chamber 39 to assure that media interfaces will continue at the same height into the probe. Although it is contemplated that the openings 41 may take any of several forms, in the preferred embodiment shown, the openings 41 are narrow axially elongated slots disposed in axial alignment along the probe. A primary criterion for these openings is that they provide a negligible change in impedance along the length of the probe. More particularly, the slots 41 in the present embodiment are arranged to provide a reflection coefficient which is less than the resolution of the time domain reflectometry equipment hereinafter discussed. Thus, in the present embodiment the slot reflection coefficient is less than 0.001 and any additional reflections caused by the slots are too small to be seen by the measuring device. In the particular embodiment shown, the length of the openings 41 substantially exceeds the diameter of the conduit 26, the axial separation between openings is a small fraction of their length and the width of the slots 41 is a small fraction of the conduit diameter. It is contemplated that a continuous slot may be provided in the conduit instead of spaced holes although this may detract somewhat from the rigidity of the probe construction.

One or more reflective discontinuities 46 are fixed along the length of the probe. These discontinuities are formed by varying the geometry of at least one of the conductors 21 and 26 for a short axial distance along the probe. In the particular embodiment shown, discontinuity 46 comprises a slot cut transversely through the conduit 26 between adjacent openings 41. The slot 46 is uniform in width axially of the probe and extends slightly more than halfway through the conduit. The slot takes up only a portion of the web between the two adjacent openings 41 and thus a very small fraction of the probe length. The slot 46 provides a positive step impedance change in the characteristic impedance of the probe. Thus, a portion of any pulse propagated along the probe will be reflected by the slot 46 and thus will furnish a marker on the time base of the probe output signal corresponding to a known location on the probe. Although the probe may be of any desired length, the probe here shown is about 36 inches long, the discontinuity 46 being located about 10 inches from the bottom thereof.

The apparatus 10 further includes a detector 51 which has an input 52 connected to the probe 11 through the cable 14. Thus, the pulse applied by the source 13 to the probe appears at the input 52 of the detector together with any reflections from impedance discontinuities along the line 14 and probe 11. Although in the particular embodiment shown, the detector is spaced from the probe, it is contemplated that a detector located at the upper end of the probe may be employed, if desired, to avoid reflections introduced by the line 14. The detector may be of any convenient type and preferably has a first output which follows changes in amplitude of the signal appearing at the input 52 and a second output which relates to the time base of the signal appearing at input 52. In the particular embodiment shown, the pulse source 13 and the detector 51 comprise a Hewlett-Packard 1415A time domain reflectometer. This type of device has been used previously in electrical measurements such as the design and testing of transmission lines. The outputs 53 and 54 of the detector 51 connect to one or more suitable readout devices.

One such readout device is indicated at 56 and comprises an oscilloscope which may be of any known type, here a Hewlett-Packard 140A oscilloscope with a Hewlett-Packard 1415A plug-in which has a nominal rise time of 120 picoseconds. The outputs of the detector also connect, in the particular embodiment shown, to a chart recorder or x–y plotter generally indicated at 58, here, for example, a Moseley x–y recorder.

It is contemplated that the detector 51 may be of a type which senses the levels of the incident and reflected pulse waveform, applied thereto from the pulse source 13 and probe 11, to run a clock which will determine the round trip time for given conditions and thus present a fluent level. However, in the particular embodiment shown, the detector 51 functions in a somewhat different manner to obtain a very fast rise time. More particularly, the Hewlett-Packard 1415A, like other similar reflectometers, is a sampling detector which detects only a short segment of each pulse, the sampling "window" being advanced by a small increment for each successive pulse so that after a train of such pulses has passed through the detector, the detector will have sampled overlapping portions of the pulse waveform from the beginning to the end thereof. As each succeeding pulse is sampled, a value corresponding to the amplitude of the sampled segment of that pulse, such as the integral of that segment, is determined and displayed as a point on the oscilloscope screen. The display on the oscilloscope screen is built up of many such points corresponding to the train of pulses sampled by the advancing "window," the sweep frequency of the oscilloscope corresponding to that of the sampling "window," to form a smoothed representation of a pulse appearing at the input 52 of the detector.

In any event, a display appears on the screen of the oscilloscope 56 and on the x–y plotter which is identical or essentially identical to the waveform of the composite incident-reflected pulse appearing at the input of the detector 51.

OPERATION

Referring to the operation of system 10 in general, the signal source 13 produces a series of D.C. pulses with rapid rise times. Considering one such pulse, same is immediately applied to the input 52 of the detector 51 so that a corresponding fast rising voltage is applied to the oscilloscope 56 and x–y plotter at the same time. The D.C. pulse propagates along the line 14 to and through the connector 27 reaching the upper spacer 32 of the conduit 26, indicated by the level $x_0$ in FIGURE 1. There may be a small impedance mismatch between the line and probe and such will result in a small amplitude reflection from the discontinuity as the pulse propagates therepast and onto the probe. This reflection reaches the input 52 of the detector 51 at time $t_0$ (FIGURE 9).

In the embodiment shown, the container 12 is partially filled with a liquid to the level $x_1$. The pulse propagates downwardly along the upper part of the probe 11, here surrounded with air, through an impedance discontinuity at the point $x_1$ resulting from the difference in dielectric constant of the air and liquid which causes reflection of a portion of a pulse amplitude. The remainder of the pulse energy propagates down the portion of the probe 11 in the liquid to the lower end $x_2$ of the probe. The reflected energy from the point $x_1$ returns through the upper part of the probe and the line 14 and reaches the detector input 52 at a time $t_1$ (FIGURE 9). Similarly, the remainder of the pulse front reflected at the probe end $x_2$ reaches the detector input at time $t_2$. The interval $(t_1-t_0)$ is the round trip time of the pulse front from the upper probe end $x_0$ to the discontinuity $x_1$ and back again. In this case, $$t_1-t_0=\frac{2(x_1-x_0)}{V_p} \quad (1)$$

where $v_p$ is the velocity of the pulse along the portion of the probe between $x_0$ and $x_1$, where the dielectric constant of the surrounding air is $k_1$. It is known that $$v_p=\frac{C}{k_1} \quad (2)$$

where C is the speed of light, Thus, for air $k_1=1$, and $$t_1-t_0=\frac{2(x_1-x_0)}{C} \qquad (3)$$

Thus, the time $t_1-t_0$ is directly proportional to the distance $x_1-x_0$ between the air-liquid interface and the input end of the probe. The distance $x_1-x_0$ is thus readily calculated and yields the liquid depth when subtracted from the distance between the top of the probe to the bottom of the container. Thus, the liquid level is readily obtained.

If the amplitude of a pulse impinging on an impedance discontinuity is equal to P, then the reflected amplitude equals $\rho P$, $\rho$ being the reflection coefficient or signal fraction reflected. The reflection coefficient $$\rho=\frac{\sqrt{k_1}-\sqrt{k_2}}{\sqrt{k_1}+\sqrt{k_2}} \qquad (4)$$

where $k_1$ and $k_2$ are the dielectric constants of the air and the liquid, respectively. Thus, the dielectric constant $k_2$ of the liquid can be found in terms of the reflection coefficient $\rho$ and the dielectric constant of air (about 1). More particularly, the above expression for $\rho$ can be solved for $k_2$ to obtain $$k_2=k_1\left(\frac{1-\rho}{1+\rho}\right)^2 \qquad (5)$$

In FIGURE 9 are plots of actual measurements made with the probe 11 in the bath 12 of FIGURE 1. These plots show the general shape of the pulses with the reflection imposed thereon as applied to the detector input 52 as would appear on the screen of the oscilloscope 56 and x-y plotter 58. The rise A of the pulse supplied by generator 13 is succeeded by a constant amplitude portion B which corresponds to the time required to send the part of the pulse down the line 14 to the upper end of the probe and to have a small reflection indicated at C returned to the detector input 52. The portion D including portion E ($t_1-t_0$) represents the time required for the pulse to propagate from the generator to the surface of the liquid at $x_1$ in the container and return to the detector.

Although the above discussion of operation has been in terms of dielectric liquids, i.e., liquids for which a change in the impedance of the probe is caused by a change in dielectric constant of the liquid, it will be recognized that the system embodying the invention is capable of use with liquids in which the dielectric constant is not the primary characteristic determining the probe impedance. On the contrary, the system can be used with media in which magnetic permeability is the primary determiner of probe impedance. Such a medium would be, for example, a slurry or suspension of ferrous particles in a suitable fluid. Further, the system is usable with media in which conductivity has the primary effect on probe impedance. Thus, in general the reflection coefficient at the interface between two media is $$\rho=\frac{z_1-z_2}{z_1+z_2} \qquad (6)$$

where the differing impedances $z_1$ and $z_2$ of the portions of the probe in the different media may thus be primarily a function of capacity, inductance or conductivity and hence the dielectric constant, permeability or conductivity of the media.

FIGURE 9 discloses plots for several dielectric liquids, here gasoline, carbon tetrachloride, vegetable oil, methyl alcohol and water. Since the plot for each of these liquids essentially coincides over the portion D, it will be apparent that container 12 was filled to the same level with each successive liquid. For each liquid there is, due to reflection at the surface of the liquid, a drop F in the trace amplitude. Also, the point at which the trace levels off, as indicated for example at G for vegetable oil, varies according to the liquid involved. The length of the portion F is proportional to the reflection coefficient at the air-liquid interface and therefore can be used to determine the dielectric constant of each of the liquids. The apparatus can readily be calibrated to allow direct reading of the reflection coefficient $\rho$ from the oscilloscope screen, as by adjusting, in a conventional manner, the vertical gain of the oscilloscope until the height of rise A equals a convenient unit of measurement on the oscilloscope screen. At the rightward end of the horizontal portion G, there is another vertical shift of the trace indicated caused by reflection of the pulse at the end of the probe.

It will be noted that the portion F of each trace, corresponding to the air-liquid interface, extends downwardly indicating a negative reflection coefficient. A negative reflection coefficient results when the dielectric constant of the first medium is less than that of the second medium in accordance with Equation 4 above.

It will be apparent that the probe 11 is usable to detect several interfraces at once as when several layers of liquid are present in the container and produce impedance discontinuities along the probe, since a reflection will occur at each interface.

FIGURE 10 discloses traces J, K and L, all made for the same liquid, gasoline, for different liquid levels. For the trace J the liquid level was near the bottom of the probe and for the trace L the liquid level was near the top of the probe. The character E′ indicates the sum of the pulse transit and reflection times along the upper part of the probe and the character F′ indicates the reflection coefficient for the trace L. It will be noted that the change in level indicated by portion H′ for the trace L of the highest liquid level is shifted leftwardly along the time axis from the corresponding portions of the traces J and K which give evidence of the difference in velocity of pulse propagations along the probe in its air filled and gasoline filled portions.

Given that the time axis of the plot is correctly calibrated but that the velocity of pulse propagation along the probe is not known (a reasonable assumption since the velocity varies not only with the fluid contacting the probe but, generally, with the fluid temperature as well), a determination of the liquid level can be made from length of the probe and the pulse propagation times along the air filled and gasoline filled portions of the probe for two different liquid levels. Thus, to determine one liquid level, this procedure requires a plot taken at that liquid level or at an additional liquid level.

As an alternative, given the reflection coefficient $\rho$, the ratio of dielectric constants $k_a$ and $k_g$ for air and gasoline can be computed from Equation 5 above, $$k_a/k_g=\left(\frac{1-P}{1+P}\right)^2 \qquad (7)$$

(given that the fluids involved are known to be dielectric fluids). The ratio of the velocities of pulse propagation in the air filled and gasoline filled probe portions is $$\frac{v_a}{v_g}=\frac{\Delta x_a}{\Delta t_a}\cdot\frac{\Delta t_g}{\Delta x_g} \qquad (8)$$

where $\Delta x_a$ and $\Delta x_g$ are the lengths of the air and gasoline filled probe portions and $\Delta t_a$ and $\Delta t_g$ are total transit and return times for the pulse and reflection in air and gasoline, respectively, i.e., E′ and G′ in FIGURE 10.

The relation $$v=\frac{C}{\sqrt{k}} \qquad (9)$$

where C is the speed of light allows the ratio of velocities to be expressed as a ratio of dielectric constants so that $$\frac{k_g}{k_a}=\frac{\Delta x_a}{\Delta t_a}\cdot\frac{\Delta t_g}{\Delta x_g} \qquad (10)$$

and therefore:

$$\frac{\Delta x_a}{\Delta x_g} = \frac{\Delta t_a}{\Delta t_g} \left(\frac{1-P}{1+P}\right)^2 \quad (11)$$

Since $\Delta x_a + \Delta x_g = \Delta x_t$, the total probe length, the location of the air-gasoline interface on the probe is established. This method requires that the oscilloscope display be adjusted to maintain calibration of this reflection coefficient despite temperature changes in the liquid.

The probe 11 greatly simplifies and makes more direct the determination of liquid level by the provision of one or more grooves 46 which form a fixed impedance discontinuities on the probe. FIGURE 11 shows several curves as would appear on the screen of the oscilloscope 56, using the probe 11 with one such groove 46 representing the signal at the input 52 to the detector 51. These curves were made with the container 12 partly filled with water. For the solid line curve, the water level was below the discontinuity 46. The water level was at the groove 46 for the dotted line curve and above the groove 46 for the chain line curve. The portion E″ of the solid line curve in FIGURE 11 relates to pulse propagation along the upper, air filled part of the probe, the portion of curve labeled F″ indicates the discontinuity caused by the air-water interface and the portion G″ indicates the portion of the trace related to the propagation of the pulse in the water.

Intermediate its ends the portion E″ contains a spike S which is caused by the reflection of pulse energy from the groove 46, the spike occurring at time $t_x$. The presence of the spike S allows a positive determination of the liquid level without knowledge of dielectric constants or multiple runs at different levels. More particularly, the portion E″ extends between time coordinates $t_0$ and $t_1$ corresponding to probe length coordinates $x_0$ and $x_1$, respectively. As a result, $$x_1 - x_0 = \frac{v_1}{2}(t_1 - t_0) \quad (12)$$

where $v_1$ is the velocity of the propagating pulse along the section of the portion $x_1$-$x_0$ of the probe. On the other hand, the length of probe from the input end to the slot 46 is $$x_s - x_0 = \frac{v_1}{2}(t_s - t_0) \quad (13)$$

Thus, $$x_1 - x_0 = \frac{(x_s - x_0)(t_1 - t_0)}{t_s - t_0} \quad (14)$$

If $x_0 = t_0 = 0$, $$x_1 = \frac{x_s t_1}{t_s} \quad (15)$$

the values on the right all being known. Thus, we are immediately given $x_1$, the distance from the input end of the probe to the liquid. Given the distance from the input end of the probe to the bottom of the container the liquid level in the container can be found.

Should the liquid level rise above the groove 46, the liquid level is still readily determinable. This is the arrangement shown generally in FIGURE 1 and by the chain line plot of FIGURE 11. Here the time at which the pulse reflection from the surface of the liquid returns to the detector is marked $t_{1'}$, the time at which the pulse reflection from the slot returns is marked $t_{s'}$ and the time at which the pulse reflection from the end of the probe returns is marked $t_{2'}$. Position coordinates $x_1$, $x_s$ and $x_2$ in FIGURE 1 correspond to times $t_{1'}$, $t_{s'}$ and $t_{2'}$. Thus, $$x_2 - x_1 = \frac{v_2}{2}(t_{2'} - t_{1'}) \quad (16)$$

where $v_2$ is the velocity of propagation of the pulse along the probe portion in the water between the points $x_1$ and $x_2$. Further, $$x_s - x_1 = \frac{v_2}{2}(t_{s'} - t_{1'}) \quad (17)$$

Therefore, adding the two equations, $$x_2 + x_s - 2x_1 = \frac{v_2}{2}(t_{2'} - t_{1'}) + \frac{v_2}{2}(t_{s'} - t_{1'}) \quad (18)$$

This gives us the distance of the liquid surface from the input end of the probe as follows:

$$x_1 = \frac{x_2 + x_s}{2} - \frac{v_2}{4}\{(t_{2'} - t_{1'}) + (t_{s'} - t_{1'})\} \quad (19)$$

The distances $x_2$ and $x_s$ are fixed distances on the probe and are thus known. The time intervals $(t_{s'} - t_{1'})$ and $(t_{2'} - t_{1'})$ are directly measurable from the chain line plot of FIGURE 11.

The liquid level can be found even more simply, for example, by adjusting the horizontal width of the display on the oscilloscope screen until the numerical value of the trace distance $t_s - t_0$ (or $t_{2'} - t_{s'}$ if the liquid level is above the slot 46) as read from the grid on the screen equals the numerical value of the distance $x_s$ (or $r_2 - x_s$). The distance of the air-liquid interface from the upper (or lower) end of the probe can then be directly read from the grid of the oscilloscope screen and from this the liquid level can be rapidly determined.

With the liquid level at the groove, the liquid level is immediately determinable from the location of the probe in the tank.

While the foregoing detailed description has for illustrative purposes been directed toward the measurement of the level of a liquid in a container, it will be evident that a variety of other uses may be found for the method and apparatus of the invention. For example, instead of detecting with a fixed probe the level of a movable liquid in a fixed tank, it is equally feasible to determine with a movable probe the level of a liquid, whose level is either fixed or movable, in a fixed container. An example is illustrated in FIGURE 12 where the probe 60 is vertically movable on cable 61 by drum 62 to determine the level of water 63 in well 64. It will be understood that to assure sharpness in output reading the speed of vertical movement of the probe should not move within the reflecting time of one pulse a distance more than that which will appear on the oscillograph as a single sharp line. This same limitation on speed of relative movement between the liquid level and the probe exists also where the probe is fixed and the liquid level moves.

Still other uses are within the broader aspects of the invention, one example is to measure the surface level of fluent materials other than liquids, such as the level of grain or powdered solids in a bin or hopper. Another example is to determine the dielectric constant, and therefore the composition, of a material having a fixed level.

The embodiments of the invention in which an exclusive property or privilege is claimed are defined as follows:

1. In a time domain reflectometry probe construction cooperable with a pulse generating and readout instruments for sensing levels and dielectric constants of fluent materials by insertion into a container thereof, the combination comprising:

an elongated, electrically conductive element of constant cross section between its ends;

a cylindrical, electrically conductive conduit telescoped over said element;

a fitting at one end of said conduit and element for making electrical connection thereto;

spacer means rigidly holding said conduit and element, the diameter of said element being less than the inside diameter of said conduit for defining an annular chamber therewithin;

a plurality of closely spaced slots through the wall of said conduit, said slots being axially distributed along with said conduit, for admitting fluent material into said annular chamber, the width of said slots being a small fraction of the diameter of said conduit;

a transverse groove in said conduit, opening through the wall thereof, said groove defining a discontinuity of known location along the length of said probe.

2. In a time domain reflectometry probe construction cooperable with a pulse generating and readout instrument for sensing levels and dielectric constants of fluent materials by insertion into a container thereof, the combination comprising:

an elongated, electrically conductive element of constant cross section between its ends;

a cylindrical, electrically conductive conduit of constant diameter and thickness between its ends telescoped over said element;

a fitting at one end of said conduit and element for making electrical connection thereto;

spacer means rigidly and coaxially holding said conduit and element, the diameter of said element being less than the inside diameter of said conduit for defining an annular chamber therewithin, one of said spacers being disposed at the other end of said conduit and element and defining openings into said annular chamber for admitting fluent material thereinto;

a plurality of elongated, closely spaced slots through the wall of said conduit, said slots being axially distributed along and aligned with said conduit, for admitting fluent material into said annular chamber, the width of said slots being a small fraction of the diameter of said conduit;

a transverse groove in said conduit, opening through the wall thereof, said groove extending through a large fraction of the circumference of said conduit and being of axial extent less less than the diameter of said conduit, said groove defining a discontinuity of known location along the length of said probe.

3. A system for measuring characterisitics of fluent media, comprising:

a source of spaced, high rise rate D.C. pulses;

a probe construction including at least a pair of spaced, generally parallel conductors, the area between said conductors being open to allow fluent media to enter therebetween, said probe being of constant geometric cross section throughout its length for providing a uniform impedance therealong in the presence of said conductors and further including at least one geometrical discontinuity which is short in axial dimension as compared to its dimension radially of the probe, said geometrical discontinuity providing an impedance discontinuity fixed along the length of the probe for use as a marker and to which impedance discontinuities due to fluid interfaces may be compared for locating same on the probe;

guide means guiding said probe and said media into contact with each other, the fluent media extending between said conductors for determining the impedance of the corresponding length of said probe whereby pulses applied to said probe will be reflected in part at impedance discontinuities therealong determined by said interfaces between said media; and output means connected to said probe for monitoring the reflected waveform from said probe, discontinuities in the amplitude of said waveform appearing at points in time related to the positions of said interfaces along said probe.

4. A system for measuring characteristics of fluent media, comprising:

a source of spaced, high rise rate, square D.C. pulses having a rise time negligible in comparison to the duration thereof;

a probe construction including at least a pair of spaced, generally parallel conductors, the area between said conductors being open to allow fluent media to enter therebetween;

guide means guiding said probe and said media into contact with each other, the fluent media extending between said conductors for determining the impedance of the corresponding length of said probe whereby pulses applied to said probe will be reflected in part at impedance discontinuities therealong determined by interfaces between said media;

output means connected to said probe for monitoring the reflected waveform from said probe, discontinuities in the amplitude of said waveform appearing at points in time related to positions of said interfaces along said probe;

said square D.C. pulses having a duration exceeding the sum of the pulse travel time from said source to the far end of said probe and the return time to said output means to allow determination of media levels by comparison with the location in time of amplitude discontinuities in the monitored reflected waveform.

References Cited

UNITED STATES PATENTS 2,651,752  9/1953  Devot _____ 324—52

RUDOLPH V. ROLINEC, Primary Examiner

P. F. WILLE, Assistant Examiner

U.S. Cl. X.R.

73—290, 304; 324—52; 340—244